Sept. 10, 1929. L. BREGUET 1,727,696
AUTOMATIC LANDING BRAKE FOR AEROPLANES
Filed May 17, 1928 7 Sheets-Sheet 1
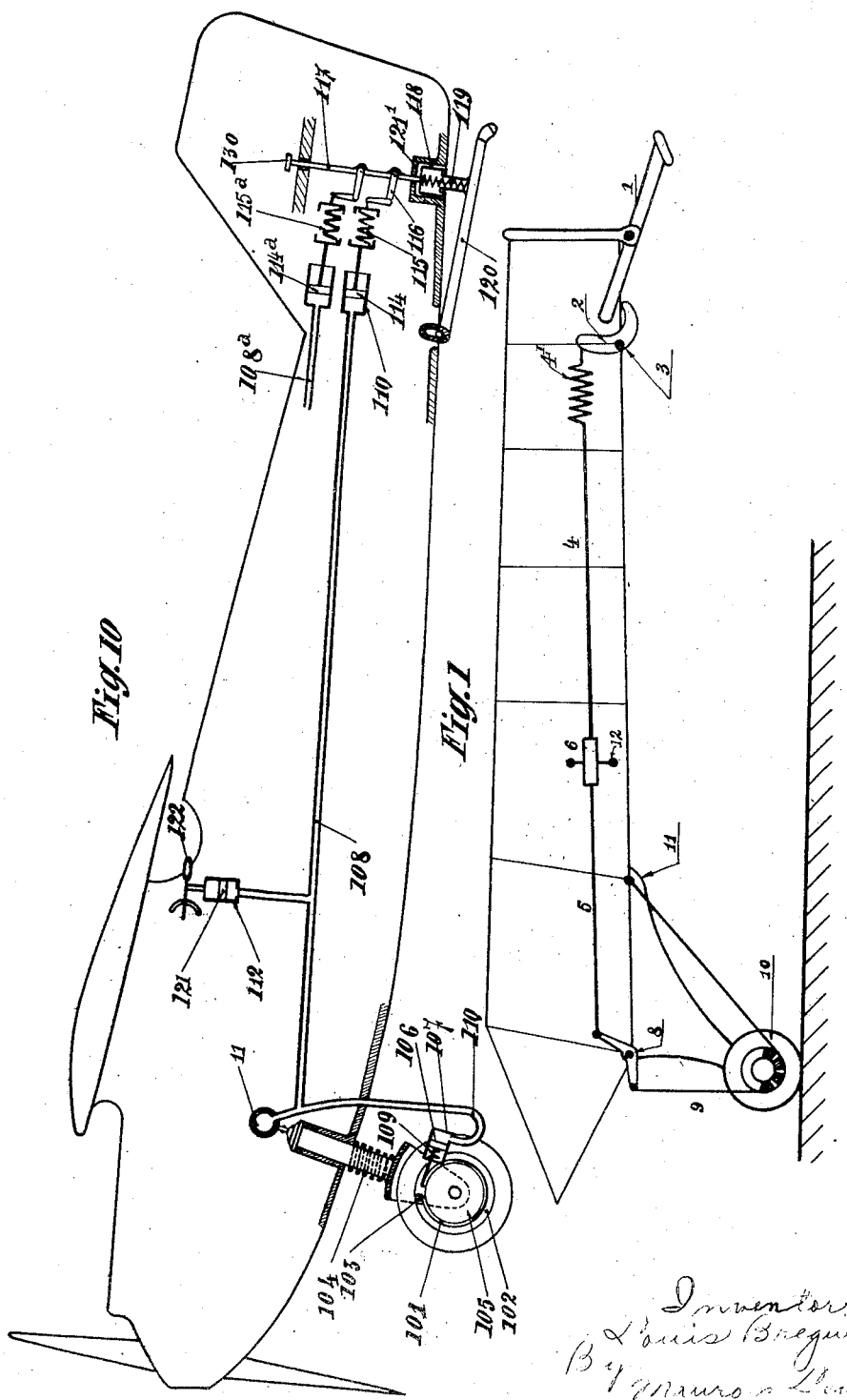

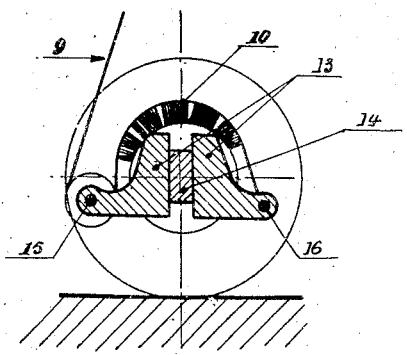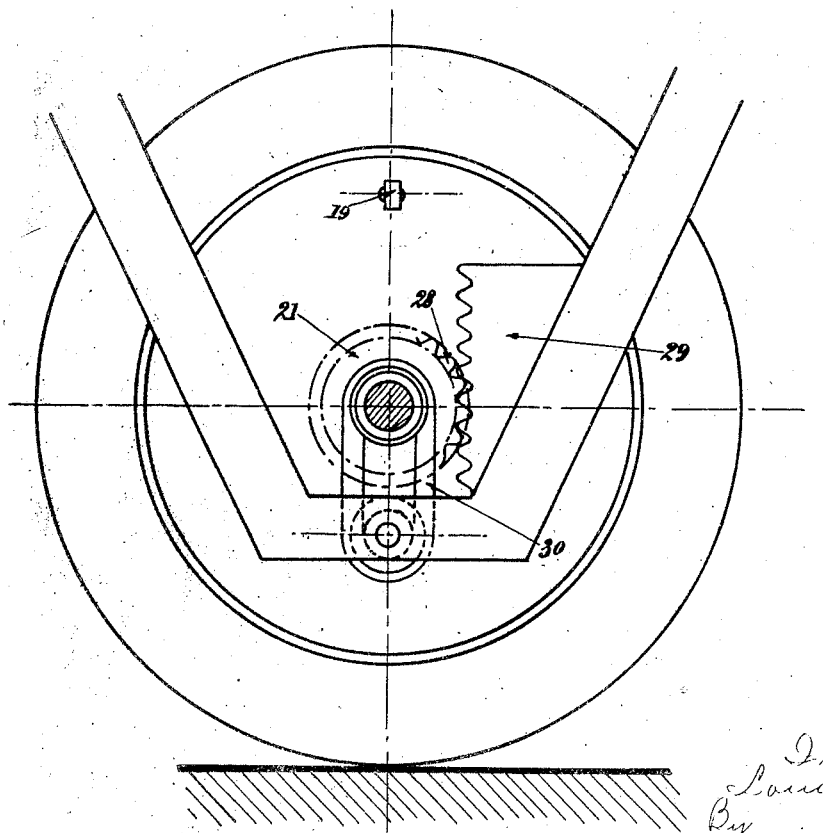

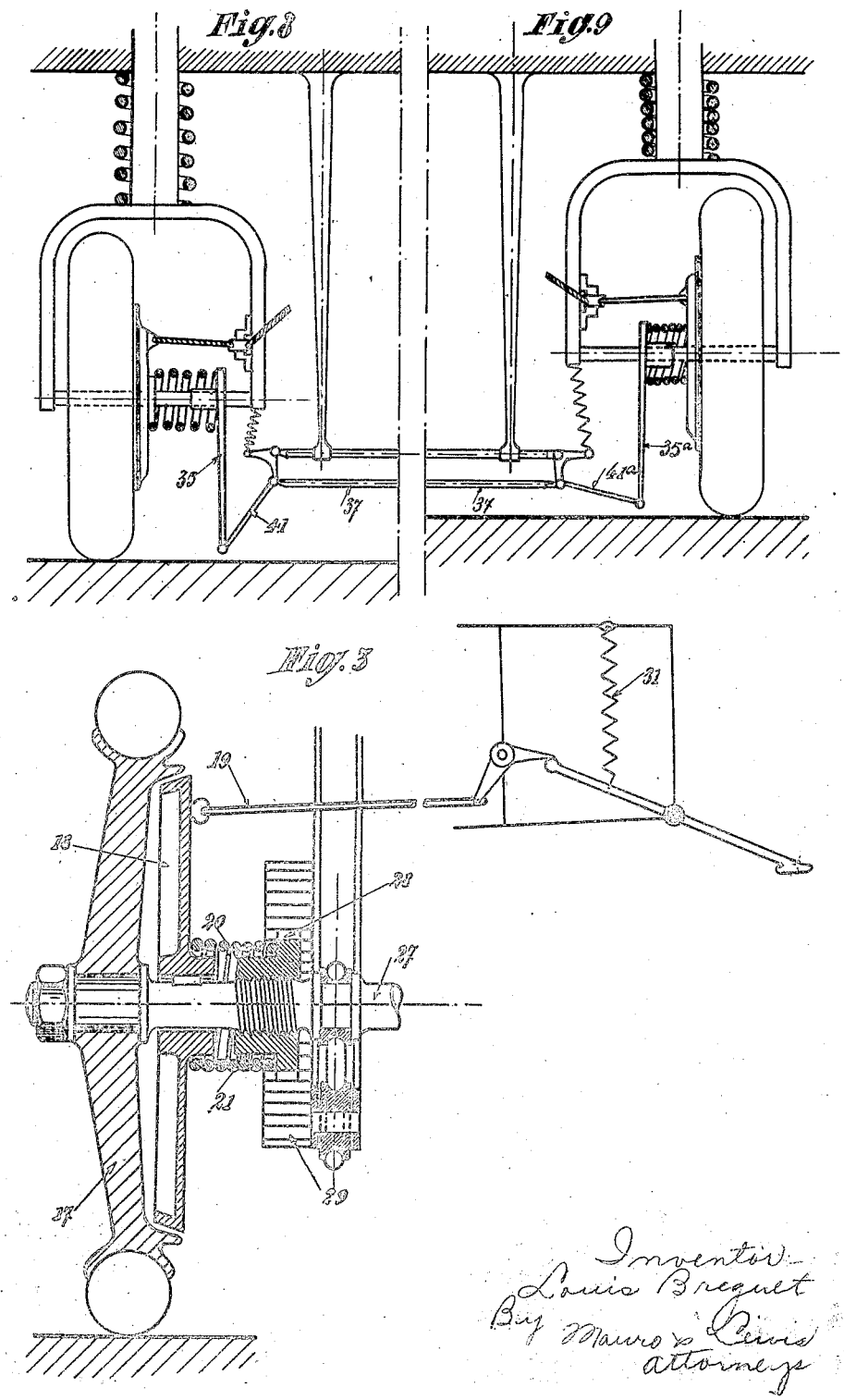

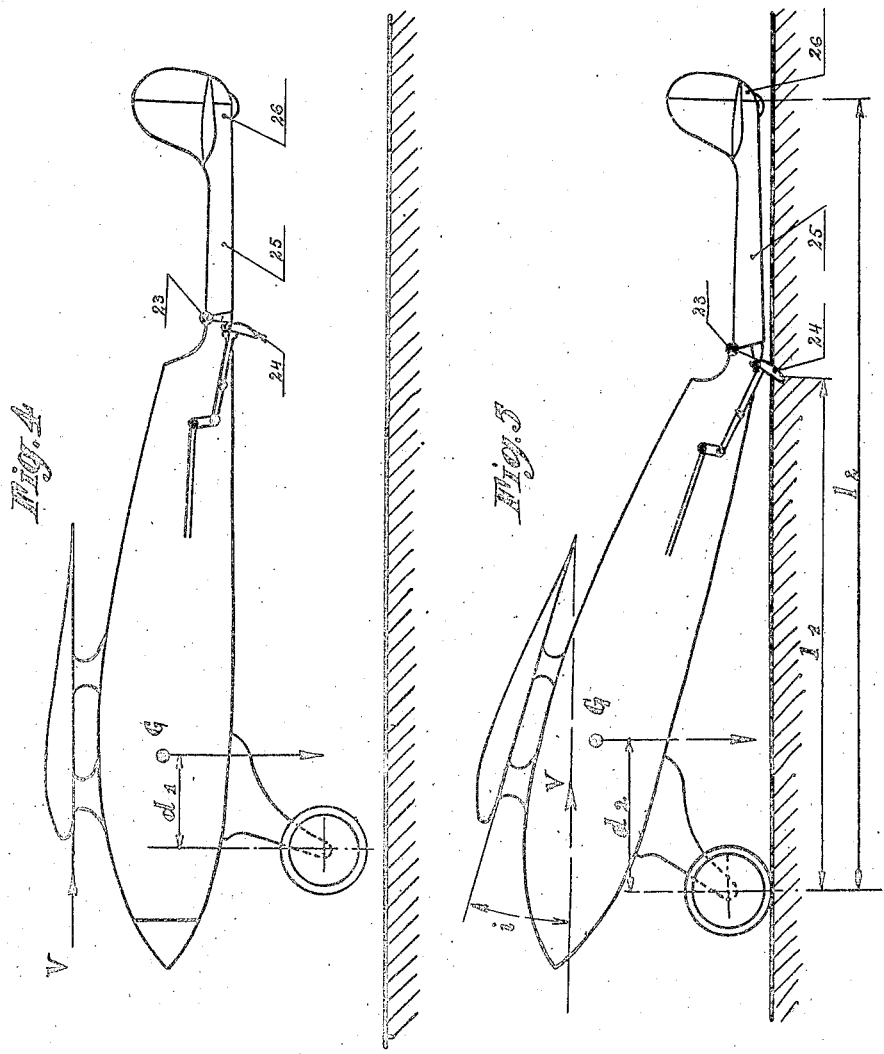

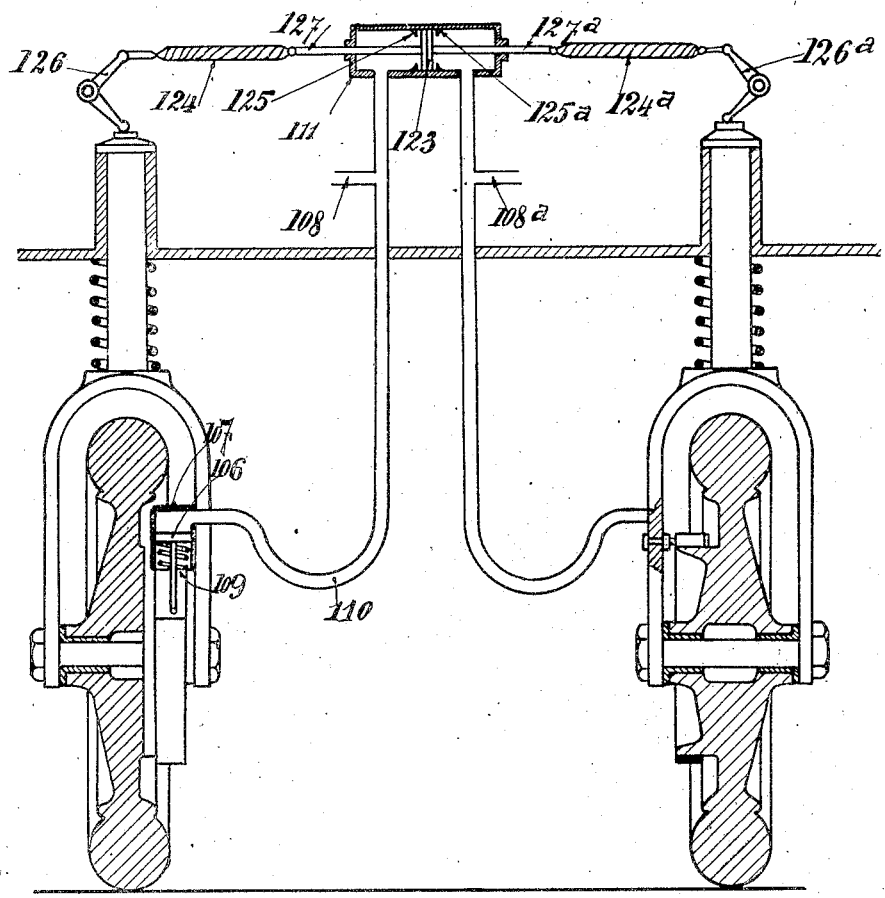

Patented Sept. 10, 1929.

1,727,696

UNITED STATES PATENT OFFICE.

LOUIS BREGUET, OF PARIS, FRANCE, ASSIGNOR TO SOCIETE ANONYME DES ATELIERS D'AVIATION LOUIS BREGUET, OF PARIS, FRANCE, A COMPANY OF FRANCE.

AUTOMATIC LANDING BRAKE FOR AEROPLANES.

Application filed May 17, 1928, Serial No. 278,480, and in France May 19, 1927.

The present invention relates to automatic brake apparatus for aeroplanes for landing purposes, which permits a great reduction of the length of the rolling of the aeroplane on the ground, by effecting a suitable braking of the wheels, and this braking may be combined with the use of tails or skids rubbing on the ground.

The said system has chiefly for its object to effect the braking in such manner that the wheels cannot slide and the aeroplane cannot overturn. It permits in particular to vary the moment of braking when applied to the wheels, either proportionally, or according to a given function of the load on the wheels due to the weight of the aeroplane.

In this case, the control of the brake can be connected with the elastic landing device. This connection is constituted in such manner that the more the aeroplane is heavy hence the greater the deformation of the elastic landing device, the more powerful is the action of the brake.

To prevent the aeroplane from overturning, the brake is operated by the skid or tail, or by any other element of the aeroplane situated back of the wheels and adapted to absorb the perssure of the aeroplane on the ground, in such manner that the moment of the braking as applied to the wheels will increase according to a determined function of the pressure or weight of this element upon the ground and will for instance be proportional thereto.

The braking becomes less when the aeroplane commences to overturn, the element will bear less on the ground, and the braking will cease when the said element leaves the ground, or when the weight of the element on the ground attains a determined minimum value.

The braking is thus effected with the maximum security, a progressive action, and a perfect continunity.

In fact, while the braking by the air diminishes when the aeroplane slows up, the braking by the wheels increases since the pressure of the aeroplane on the ground increases. The resulting braking is thus continuous, and the slowing is effected rapidly and without sudden variations. The transmission of the operations and controls of the braking to the wheels of the aeroplane may be either mechanical or hydraulic.

The following description with reference to the appended drawings which are given by way of example will set forth the manner in which the invention is carried into effect.

Figure 1 shows diagrammatically the braking device which prevents the aeroplane from overturning.

Figure 2 shows diagrammatically a braking device applied to wheels provided with guides.

Figures 3 and 3b is show an example of the connection between the control of the brake and the shock-absorbing device of the wheels.

Figures 4 and 5 show a modification of the device indicated in Figure 1.

Figures 8 and 9 show the arrangement, for each wheel, of a braking which depends on its respective load and also on the difference of load on the two wheels.

Figure 10 is a diagrammatic longitudinal section of one side of the hydraulic transmission device.

Figure 11 is a diagrammatic cross section showing the differential apparatus for equilibrating the pressures in the two transmissions.

Figure 6:
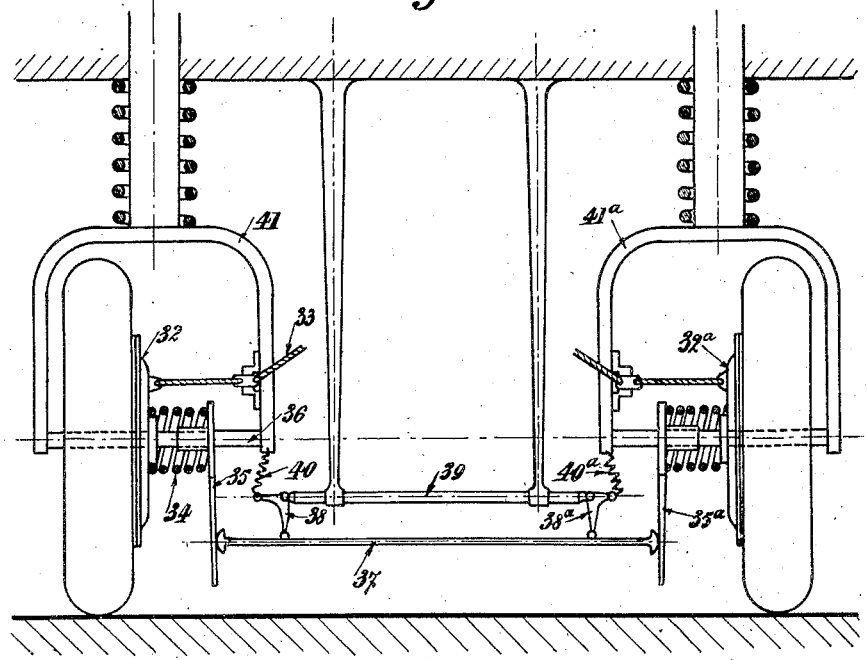
Figures 6 and 7 are diagrammatic views showing a device permitting to assure on each wheel a braking independent of their load and proportional to the differences of the load on the wheels.

The braking device for preventing the areoplane from overturning may be constructed as shown in Figure 1.

The skid 1 acts upon the brake 10 by means of the lever 2 which is pivoted at 3, the traction spring 4', the bar 4, the device 6 to be further mentioned, the bar 5 of the bell-crank lever 7 pivoted at 8, and the cable 9 attached at 11 which acts upon the shoes of the wheel 10. When the skid rests upon the ground, it cocks the spring 4', which through the medium of the said transmission exercises traction on the cable 9 which brakes the wheel by friction upon its shoes.

The said brake may consist of shoes coacting with a drum as shown in Figure 1 by way of example, but it may be constructed in any other manner.

If the weight of the skid diminishes, when the areoplane commences to overturn, the tension of the spring 4′ diminishes, and the braking action of the cable 9 as well; when the skid leaves the ground, the spring 4′ is no longer cocked and the braking ceases.

The device 6 permits to neutralize the braking action of the skid when rising from the ground. This device may be a sort of stretcher consisting of a metallic sheath controlled by the pilot by means of a hand wheel 12, and carrying two parts threaded in the contrary direction into which are screwed the two rods 4 and 5. The said sheath thus permits to increase the length of the rods 4 and 5 and hence to expand the brake controls at will.

The device 6 may be replaced by any suitable device adapted to modify the total length of the rods 4 and 5. It may also serve to stretch the brake controls so as to hold the wheels, when it is desired to operate the motor when the aeroplane is stationary.

Figure 2 shows by way of example, and for the proper understanding, the diagram of the braking device which acts in proportion to the weight of the areoplane applied to the wheels provided with guides. The axis of the wheels is mounted in the member 14 movable in the guides 13. The cable 9 passes over the pulley 15 whose shaft is secured to the guide 13. It acts upon the brake 10, and is attached to a fixed point 16 on the guide. It is observed that if the weight of the aeroplane on the wheels increases, the relative motion of the pieces 13 and 14 will increase the tension of the brake.

The connection between the brake control and the skid on the one hand and the system for damping the wheels on the other hand, may be variously effected.

Figures 3 and 3$^b$ is show a form of construction according to this principle in which the braking is proportional to the load upon the wheel and to the load upon the skid or like element disposed at the rear of the aeroplane and subjected to its weight as above specified, in such manner that when the said skid (or the like) leaves the ground, the braking action ceases.

The wheel 17 which is loose on the shaft 27 is braked by the disc 18 which is slidable without rotation on the same shaft and is urged by a compression spring 20 which makes contact with the sleeve 21, said sleeve 21 is screwed to the axle 27, and it is is provided with teeth 28 coacting with the rack 29 secured to the main frame of the landing gear. The shaft 27 is connected with the said frame by the elastic cord device 30.

If the weight upon the wheel increases, the elastic cord device will lengthen, and the relative movement of the rack and pinion will screw upon the said shaft the sleeve 21 which thus moves to the left and increases the pressure of the spring 20 which controls the braking action by pressing the disc 18 against the wheel.

On the other hand, the disc 18 moves with the skid by means of the rod 19, and it is displaced in a direction such that if the skid descends by the effect of its reaction spring 31, i. e. if the tail of the aeroplane leaves the ground, the disc 18 will be moved to the right and the braking ceases, the action of the spring 31 prevailing over the action of the spring 20 in all positions of the sleeve 21. The said device thus affords a braking which is proportional to the weight which is brought upon the wheels and upon the skid, and which is annulled when the skid leaves the ground.

To eliminate the braking when the aeroplane rises from the ground, it is simply necessary to shorten the rod 19, for instance by a device of the type above described, so as to constantly separate the disc 18 from the said wheel, irrespectively of the actions of the skid or the wheel.

As a modification, the skid 1 may be replaced by an additional skid provided with hooks dragging in the ground, which is connected with the brake as the skid 1 and is adapted to be released by the pilot at will.

As another modification, the following improvements, which serve to augment the braking by increasing the weight of the aeroplane upon the skid, may be combined with the preceding device.

The beam 25 (Figures 4 and 5), which carries the tail, is pivoted on the axle 23 situated at the rear part of the fuselage. The rear part of the fuselage carries a skid 24 which is connected with the system of braking on the wheels and may be provided with a shoe which drags upon the ground and offers an additional braking effect on the aeroplane. The beam 25 is held in its normal position of flight by a set of elastic cords or like mechanical device, for instance a key which may be withdrawn when landing, either by the pilot or by the contact with the ground.

When landing, the beam 25 is moved out of action. The shoe 24 brakes the motion of the aeroplane. The moment of action of the weight around the wheels acting on the shoe 24 is increased due to the increase of the lever arm $d_2$ resulting from the inclined position of the aeroplane (Figure 5). The component of the weight of the aeroplane acting upon the skid 24 is greater than it would be if the skid were placed under the tail 26, since the distance $l_1$ between the skid 24 and the axis of the wheels is less than the distance $l_2$ between the tail 25 and the axis of said wheels. The aeroplane wings will have a very great incidence, which increases the braking effect of the air (Figure 5).

The rod 19 of Figure 3, or the rod 4 of Figure 1, or any other device which will neutralize the braking, may be controlled either by the skid 24 or by the beam 25 in a direction such that the braking will diminish when the weight of the aeroplane upon the parts 24 or 25 diminishes, and will be annulled when the said parts leave the ground.

Another device, also given by way of example, permits to assure on each wheel a separate braking independently of its respective load and stroke but which braking is proportional to the difference of the loads on the wheels and is also proportional to the pressure of the skid upon the ground. This device has for its object to prevent the overturning, and also prevents the aeroplane from abruptly turning about.

In this case, in fact, the aeroplane leans towards the outside of the turn, thus loading the outer wheel and relieving the inner wheel. The braking device, to be further described, will prevent this turning, by increasing the braking upon the outer wheel and reducing the braking on the inner wheel.

Figure 7:
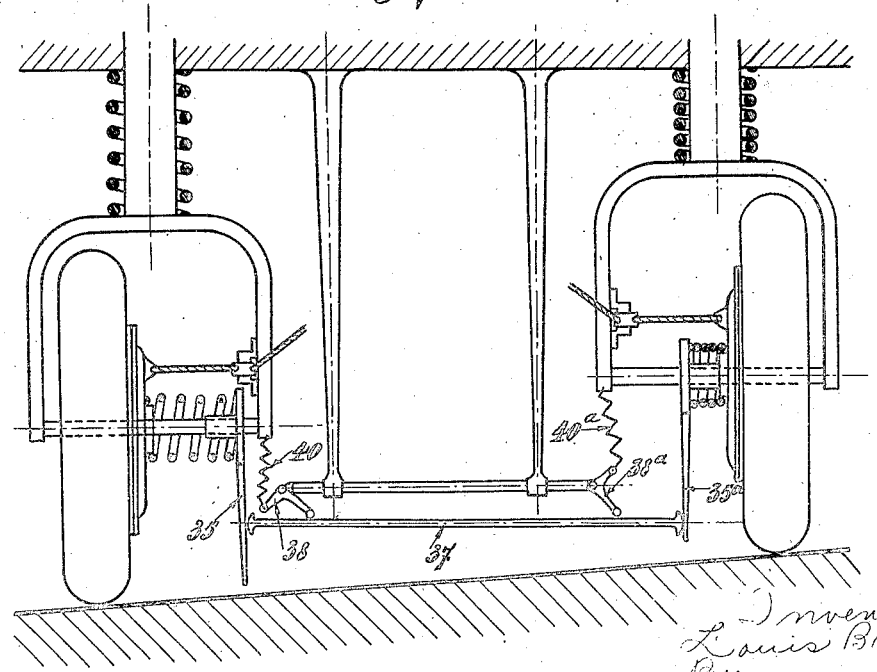

Figures 6 and 7 are diagrammatic views showing such construction. The brake disc 32 partakes of the motion of the skid by means of the cable 33, in a manner resembling what has been specified, and it is also subjected to the action of a spring 34 which is compressed by the sleeve 35 slidable without rotation on the axle 36.

A horizontal cross-bar or pivoted lever 37 is suspended from a stationary frame 39 by means of the pivoted levers 38—38$^a$, and is in contact at its ends with the sleeves 35—35$^a$.

The bell-crank levers, 38—38$^a$ are respectively connected by the springs 40—40$^a$ with the forks 41—41$^a$ which form, for each wheel, the movable landing support. If the landing gear of one wheel is subject to deformation due to the load upon it occasioned by the weight of the aeroplane (Figure 7), it will actuate the lever 38$^a$ and the horizontal cross-bar 37 through the medium of the traction spring 40$^a$. The said cross-bar also exercises a thrust upon the sleeve 35$^a$ whose motion produces a braking of the wheel which is the more energetic as the spring is the more stretched, i. e. as the load on the corresponding wheel is greater. If the landing devices for the two wheels are subjected to equal thrusts and are therefore subjected to a deformation in an equal degree, the two springs 40 and 40$^a$ being equally stretched, the cross-bar 37 will remain stationary, and the braking will be independent of the load on the wheels.

In this manner I provide a system of braking which is proportional to the difference of the load on the wheels, and the wheel which is the most loaded will alone brake the apparatus.

In the way of a modification of the same general principle, the two Figures 8 and 9 show how I may obtain, for each of the wheels, a braking which is both a function of its respective load and of the difference of load on the wheels. The said device is the same as the one shown in Figures 6 and 7, with this difference, that the cross-piece 37 no longer acts by the thrust of its ends on the sleeves 35 and 35$^a$, but is connected with the latter by the links 41 and 41$^a$.

Figure 8 shows the left-hand half of a landing device upon which the weight of the aeroplane is insufficient to produce the braking action; in Figure 9 the right-hand half of the same landing device is given, by the aeroplane, a like thrust upon both wheels, and the action of the links 40 and 41$^a$ causes the sleeve 35 and 35$^a$ to slide on the axle in order to exercise an equal braking action upon both wheels.

If one of the wheels is more heavily loaded than the other, the action of the cross-bar 37 will intervene as in the case of Figures 6 and 7. This will afford a braking which depends upon the respective load upon each wheel and upon the difference between the loads upon each wheel.

Figure 10 is a diagrammatic view showing an example of a device for the hydraulic control of the braking upon the wheels which varies in the same direction as the weight of the aeroplane on its strut, which depends upon the difference of the load upon the two wheels of the aeroplane, it being operated at the will of the pilot.

The brake is of the band type. A band 101 which is attached at one end to a fixed point 103 on the fork 104 is pressed upon the drum 105 of the wheel 102 by a suitable displacement of its other end which is obtained by a piston 106 slidable in a cylinder 107 secured to the landing device. The said piston 106 moves under the action of the pressure of the liquid contained in the cylinder, which is opposed by the action of a spring 109.

The general piping 108 is connected with the cylinder 107 by a flexible hose 110 which provides for the displacement of the wheel when the landing gear is subject to deformation. The piping 108 is connected by a branch pipe with a differential cylinder 111 (to be further described), with a controlling cylinder 112 placed within the pilot's reach and with a cylinder 113 forming part of a device controlled by the skid.

Figure 10 shows an entire view only of the piping of the braking system for the left wheel of the aeroplane; the part for the right wheel is the same. The two systems of braking of each wheel are independent in the present example, as concerns the pipe for the liquid, but they are joined through the medium of the mechanical part of the skid and of the differential device 111.

The cylinder 111 contains a piston 123 (Figure 11) separating the liquids of the pipes 108 and 108$^a$. The displacement of this piston, limited by the stops 125 and 125$^a$, depends upon the differences of the load of the aeroplane on the wheels.

For this purpose, the rods 127 and 127$^a$ of this piston are connected respectively by the elastic cord devices 124 and 124$^a$ with the bell-crank levers 126 and 126$^a$. Each of these levers is displaced together with the fork of the corresponding landing device.

If the loads on the wheels are equal, the strokes of the forks are also equal, and the cords 124 and 124$^a$ will be stretched to an equal degree and hence will not act on the piston 123; if the loads on the wheels differ, the piston is drawn to the side next the most heavily loaded wheel.

In the piston 113 is slidable a piston 114 acted upon by a compression spring 115 which is cocked by means of a bell-crank lever 116 which is controlled by the rod 117; said rod carries at the lower end a box containing a spring 119 serving as a shock-absorber for the skid 120. The stroke of the box 118 is limited by its contact with the frame 121. The rod 117 is thus limited in its displacements by this stop and the stop 130.

The spring 119 permits the skid to have a greater amplitude, without modifying its action on the braking parts, which action is limited to that obtained when the box 118 is in contact with its cage. The said stops as well as the stops 125 and 125$^a$ may be adjustable. They permit to limit the action of the brakes to a maximum, to avoid blocking the wheels during landing.

The volume of liquid in the piping 108 of the cylinders 107, 112 and 114 and the left hand half of the cylinder 111 is constant. The same is true for the circuit for the braking of the right hand wheel, which consists of like parts.

For this reason, by operating by the lever 122 the piston 121 coacting with the cylinder 112, the pilot can, as desired, act upon the pistons 106 and 114 through the medium of the column of liquid, and he may compress the springs 109 and 115.

The pilot may effect, with this device, the following controls:—

1.—When the aeroplane is stationary, he may block the wheels by driving down the piston 121 so as to send into the pipe 108 the liquid of the cylinder 112 and fill the cylinders 107 and 118, and thus compress the springs 108 and 115. The brake will be thrown with more energy according as the pressure of the piston 121 on the liquid, i. e. the effort of the pilot on the lever 122—is greater.

2.—When rising, he can obviate all possibility of braking, whatever may be the action of the skid and the loads on the wheels, by drawing up the piston 121 in such manner as to draw into the cylinder 112 the liquid contained in the cylinders 107 and 113.

3.—When travelling on the ground, he may turn about with greater facility by eliminating the braking on the outer wheel in the turn by the said means, and by braking on the inner wheel of the turn by controlling by the corresponding lever.

4.—During flight, he may prepare the apparatus for braking as soon as the skid makes contact with the ground, by placing the piston 121 at a given position so as to send into the piping the volume of liquid necessary to bring the piston 106 to a position near the braking position, and the rod of the piston 114 into contact with the spring 115, but without giving any tension to this spring.

Upon landing, the skid will bend under the weight of the aeroplane and it thus compresses the spring 119 which pushes the rod 117, and due to the lever 116—cocks the spring 115; the piston 114 now moves, and it sends liquid into the piping 108 until the piston 106 is at the end of the stroke, the brake band being pressed upon the drum. Upon the tension of the spring 115 will depend the braking effort; this latter thus varies with the load on the aeroplane, with a maximum which is attained when the box 118 makes contact with the stop.

The operation as described for the left hand wheel is the same for the right hand wheel.

If the loads on the two wheels are equal, the differential system will not act, and the wheels are equally braked, since the pressures of the liquid in the two pipes 108 and 108$^a$ are equal.

If the loads on the wheels are different, the piston 123 is urged to the side of the wheel which is the most loaded; it increases the pressure of the liquid in the corresponding pipe and diminishes that of the pipe of the other wheel.

Since the liquid is incompressible, if the pistons 106 are both at the end of the stroke in the braking position, any movement of the piston 123 will correspond to displacements of the pistons 114 and 114$^a$ in the other direction, and also to different tensions of the springs 115 and 115$^a$. The most loaded wheel will be more strongly braked, and the least loaded wheel will be less strongly braked.

When the skid leaves the ground, the spring 115 can now expand; this expansion causes a fall of pressure in the pipe 108, and the brakes are thrown off. The bores of the cylinders 107—111—113, the strokes of the pistons 106—114—123, and the positions of the stops 125 and 125$^a$, are so determined that the volume of liquid entering the cylinder 113, when the skid rises from the ground, will always be greater than that due to the cylinder 111. It will result that whatever may be the braking action due to the wheels, the braking will be annulled as soon as the skid rises from the ground, or by changing the tension of the spring 115 for example as soon as the weight of the aeroplane on the skid attains a determined minimum value.

This arrangement of hydraulic control is susceptible of various modifications permitting to realize the different cases above specified, and in particular, a braking which depends upon the load on the wheels instead of the difference of load on the wheels. In this case, the device 111 of Figs. 10 and 11 is eliminated.

Figure 12:
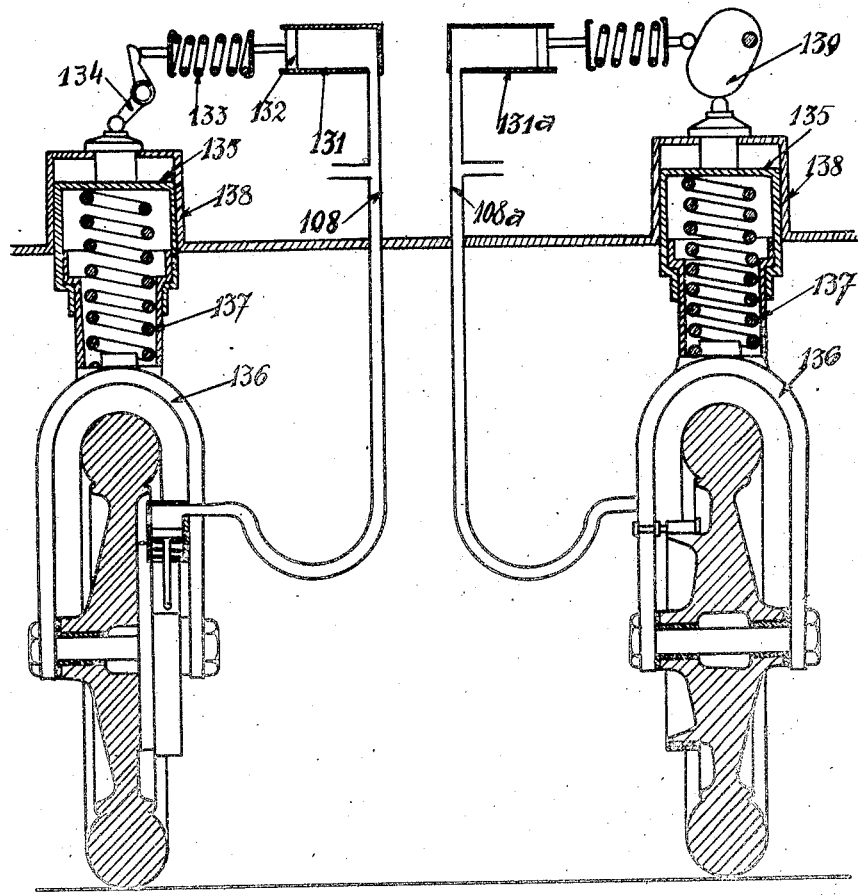
Figure 12 is a view analogous to Figure 11, showing a modified form of construction.
Figure 13:
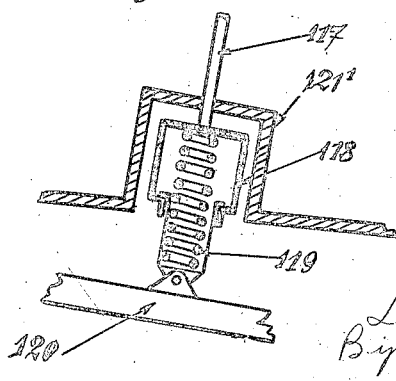
Figure 13 is a detail view of a damping spring for the skid.

The two systems for braking the wheels are separate, and each comprises a cylinder 131 or 131ª adapted to replace the cylinder 111, as shown in Figure 12.

In the cylinder 131, connected with the pipe 108, is slidable a piston 132 which is actuated by a pivoting lever 134 through the medium of a compression spring 133. The lever 134 is actuated by the box 135 slidable in a frame 136 and containing the damping spring 137 of the landing fork 136.

The disposition of the parts and their operation are the same as those of the skid. The pressure of the oil obtained by the displacement of the wheel is proportional to the load of the aeroplane on the latter and is limited to a maximum when the box 135 makes contact with its frame 138. By replacing the lever 134 by a cam having a suitable outline, such as the cam 139 represented for the right hand wheel of Figure 12, I may obtain a braking effect which is a more or less complex function of the load on the wheel.

These different dispositions are given only by way of example, and the combinations of cams, push-pieces, links, racks or varied within wide limits in order to realize the principle of the invention.

What I claim is:—

1. A system for braking upon the wheels of aeroplanes, which is adapted to reduce the distance of rolling on the ground, said system comprising in combination, individual brakes upon the wheels, said wheels being each mounted upon an axle secured to a member vertically slidable in a guide, a skid pivoted upon an axle mounted on the aeroplane, a lever in operative engagement with said skid, a cable connection between said lever and the individual brakes of the wheels, a hand control for the said cable connection, a sleeve mounted on the axle of each wheel, a spring interposed between said sleeve and the brake shoe, said sleeve being slidable on the axle of the wheel.

2. A system for braking upon the wheels of aeroplanes, which is adapted to reduce the distance of rolling on the ground, said system comprising in combination, individual brakes upon the wheels, said wheels being each mounted upon an axle secured to a member vertically slidable in a guide, a skid pivoted upon an axle mounted on the aeroplane, a lever in operative engagement with said skid, a cable connection between said lever and the individual brakes of the wheels, a hand control for the said cable connection, a sleeve mounted on the axle of each wheel, a spring interposed between said sleeve and the brake shoe, a pivoted cross-bar connected with the sleeves of the two wheels, said cross-bar being suspended from the arms of two bell-crank levers, and springs of like construction connecting the other two arms with the wheel axle.

3. A system for braking upon the wheels of aeroplanes, which is adapted to reduce the distance of rolling on the ground, said system comprising in combination, individual brakes upon the wheels, said wheels being each mounted upon an axle secured to a member vertically slidable in a guide, a skid pivoted upon an axle mounted on the aeroplane, a lever in operative engagement with said skid, a cable connection between said lever and the individual brakes of the wheels, a hand control for the said cable connection, a sleeve mounted on the axle of each wheel, a spring interposed between said sleeve and the brake shoe, a pivoted cross-bar connected with the sleeves of the two wheels, said cross-bar being suspended from the arms of two bell-crank levers, and springs of like construction connecting the other two arms with the wheel axle, a link pivoted to each end of the said cross-bar and to the corresponding sleeve.

In testimony whereof I have signed this specification.

LOUIS BREGUET.